United States Patent [19]

Hoki et al.

[11] 4,343,911
[45] Aug. 10, 1982

[54] FOAMED THERMOPLASTIC RESIN ARTICLES AND FOAMABLE COMPOSITIONS AND FOAMING PROCESSES FOR THE PREPARATION THEREOF

[75] Inventors: Tsuneo Hoki; Yutaka Matsuki, both of Suzuka, Japan

[73] Assignee: Asahi-Dow Limited, Tokyo, Japan

[21] Appl. No.: 284,264

[22] Filed: Jul. 17, 1981

[30] Foreign Application Priority Data

Jul. 17, 1980 [JP] Japan .................................. 55/96833

[51] Int. Cl.³ .............................................. C08J 9/14
[52] U.S. Cl. ...................................... 521/88; 264/53; 521/79; 521/94; 521/95; 521/143; 521/146
[58] Field of Search ...................... 521/79, 88, 94, 95, 521/143, 146

[56] References Cited

U.S. PATENT DOCUMENTS

| | | | |
|---|---|---|---|
| 3,644,230 | 2/1972 | Cronin | 521/79 |
| 4,214,054 | 7/1980 | Watanabe et al. | 521/95 |
| 4,228,069 | 10/1980 | MacLeoy | 521/95 |
| 4,289,857 | 9/1981 | Hoki et al. | 521/79 |

Primary Examiner—Morton Foelak

[57] ABSTRACT

The dimensional stability, especially at elevated temperatures such as 70° C., of thermoplastic resin foams, such as those of aliphatic olefin polymers, is substantially improved by the inclusion therein of from 0.01 to 5 weight percent, based upon said resin, of certain benzylideneaniline derivatives, azobenzene derivatives, azooxybenzene derivatives and the like.

9 Claims, 1 Drawing Figure

FOAMED THERMOPLASTIC RESIN ARTICLES AND FOAMABLE COMPOSITIONS AND FOAMING PROCESSES FOR THE PREPARATION THEREOF

BACKGROUND OF THE INVENTION

The present invention relates to the foaming or expansion of thermoplastic resin compositions and, more specifically, to foamed processes, foamable compositions and foamed articles involving a thermoplastic resin composition containing from about 0.01 to about 5 percent by weight, based on said thermoplastic resin, of at least one compound effective to suppress the escape of the blowing agent gas from the expanded foam, with a resultant improvement in the gas efficiency of the blowing agent together with a substantial reduction in the shrinkage of the expanded foam and an improvement in its elevated temperature dimensional stability.

Generally, thermoplastic resin foam is produced by adding a blowing agent to the resin and then heating the resultant resin mixture to gasify the blowing agent for expanding the resin. Thus, improvement in the efficiency of such blowing agents is very significant for commercial-scale production of foams.

Among thermoplastic resins, polyolefin resins are particularly difficult to expand directly in a commercial-scale process. This has been attributed to the high degree of temperature dependence of their thermorheological viscoelasticity and to the high gas permeability of their foam cell walls. Further complications arise from endothermic expansion and crystallization which may occur during the foaming process. Commonly, especially for expansion ratios of 5 or more, polyolefin resins are modified prior to expansion, by crosslinking or blending with other resin or resins.

Japanese Patent Publication No. 35(1960)-4,341 discloses extrusion-foaming of a noncrosslinked polyolefin resin using such a relatively expensive blowing agent as 1,2-dichlorotetrafluoroethane. However, the resulting foam product often undergoes a gradual shrinkage and a density change and has a poor surface appearance with many wrinkles. Also, it undergoes a marked shrinkage when the ambient temperature is higher than about 70° C. Thus, improved quality and dimensional control of the polyolefin resin foams produced by such a process are desirable.

More recently, a variety of chemical additives have been discovered which improve the quality and dimensional stability of thermoplastic resin foams, especially olefin polymer foams, without the necessity of crosslinking and/or of using resin blending techniques while permitting the satisfactory utilization of less expensive volatile organic blowing agents in place of 1,2-dichlorotetrafluoroethane. More specifically, such additives include saturated higher fatty acid amides, saturated higher fatty acid amines and complete esters of saturated fatty acids as disclosed in Watanabe et al., U.S. Pat. No. 4,214,054, partial esters of long chain fatty acids as disclosed in Cronin, U.S. Pat. No. 3,644,230 and Ehrenfreund, U.S. Pat. No. 3,755,208; partial and complete esters of aliphatic fatty acids as disclosed in Komori, U.S. Pat. No. 4,217,319; and the related technology of Japanese Kokai Nos. 53-102,971, 54-34,374 and 54-39,476.

The present invention provides another group of such chemical additives which are effective to improve the dimensional stability of thermoplastic resin foams, especially, aliphatic olefin polymer foams. More specifically, the present invention provides a foamable thermoplastic resin composition which is easily expanded using commonly available inexpensive blowing agents to give a foam product exhibiting reduced shrinkage and improved dimensional stability, especially, elevated-temperature dimensional stability, as well as improved surface smoothness.

SUMMARY OF THE INVENTION

In accordance with the present invention, such a foamable thermoplastic resin composition comprises a thermoplastic synthetic resin and 0.01 to 5 percent by weight, based on said thermoplastic synthetic resin, of at least one compound generally represented by the following Formula (I) or (II):

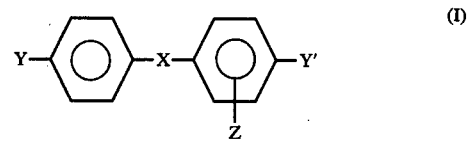

(I)

wherein X is a radical to be selected out of a group consisting of —CH=N, —N=N— and

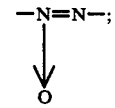

Y and Y' represent, respectively, a radical belonging to a group A consisting of —CN, —COOR, —OCOR, —NO₂, —SO₃H and —SO₃M and a radical belonging to a group B consisting of —OH, —OR, —OR—OCH₃, —HN₂, —NHR' and R or vice versa, or Y and Y' represent the same radical or different radicals belonging to said group B, with R being an aliphatic hydrocarbon group, R' being an aliphatic hydrocarbon group or a phenyl group, and M being a metal ion belonging to the Group 1a or 2a of the periodic table; and Z represents a hydrogen atom or a radical to be selected out of said group A;

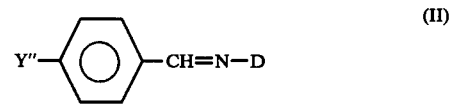

(II)

wherein D represents

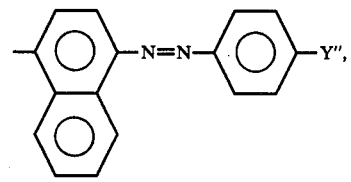

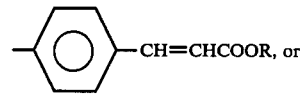

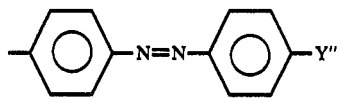

and wherein Y″ represents a radical to be selected out of a group consisting of —H, —OH, —OR, —O-R—OCH₃, —NH₂, and —NHR′; R represents an aliphatic hydrocarbon group; and R′ represents an aliphatic hydrocarbon group or a phenyl group.

DETAILED DESCRIPTION OF THE INVENTION

Figure 1:
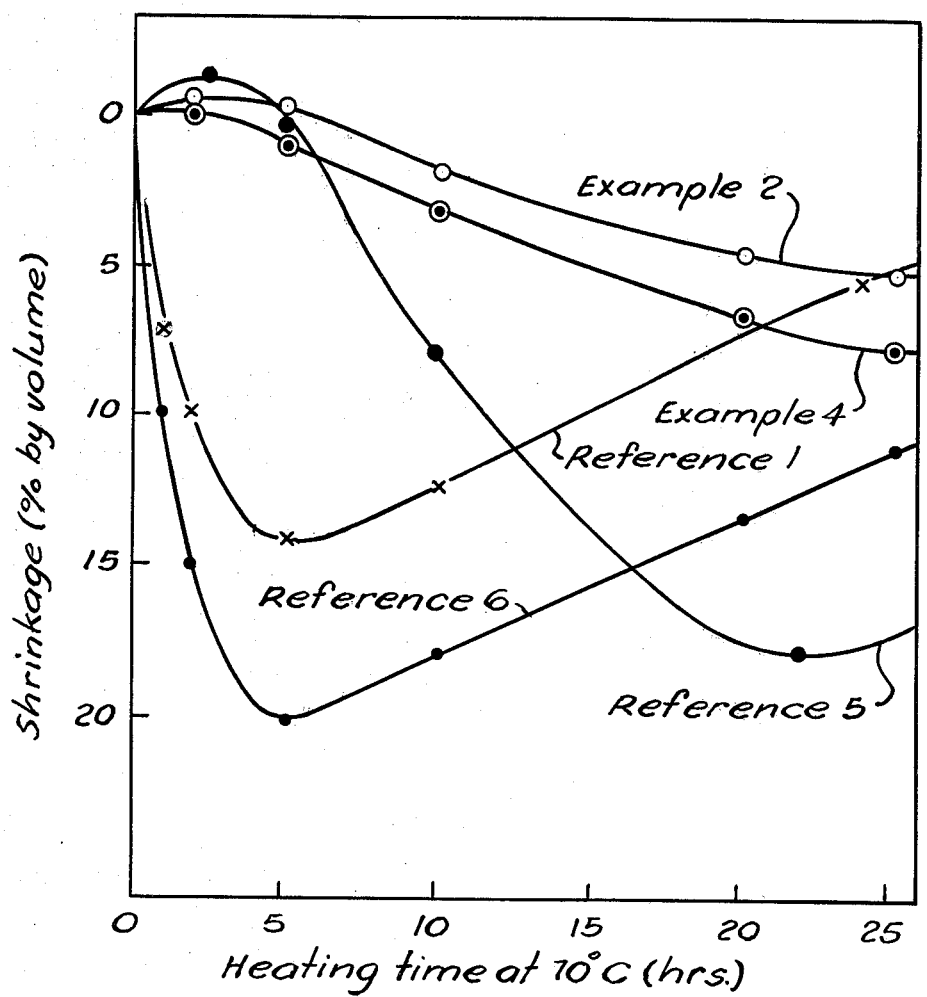
FIG. 1 is a graphical representation of shrinkage as a function of heating time at 70° C. for several foam specimens prepared in accordance with the hereinafter presented working examples and reference experiments. As can be seen from FIG. 1, the foam specimens of Examples 2 and 4 exhibited substantially less shrinkage at 70° C. than did the foam specimens of References Experiments 1, 5 and 6.

According to the present invention, the compounds represented by the foregoing Formula (I) include benzylideneaniline derivatives, azobenzene derivatives and azoxybenzene derivatives, in which the aliphatic hydrocarbon group R has 1 to 24 carbon atoms. While the compounds represented by the foregoing Formula (II) include benzal-1-aminonaphthalene-4-azobenzene derivatives, benzal-4-aminobenzene derivatives and benzal-4-aminocinnamic acid derivatives, in which the aliphatic hydrocarbon group R also has 1 to 24 carbon atoms.

The present invention may adopt, as desired, any such derivatives represented by the aforementioned Formula (I) or (II) depending on the specific thermoplastic resins used. However, it is preferable to use such compounds that have melting points below the foaming temperatures of the thermoplastic resin employed. Typical examples of such preferable compounds are p-nitrilobenzylidenetoluidine; p-nitrilobenzylideneanisidine; p-methoxybenzylidene-p′-nitriloaniline; p-acetoxybenzylideneanisidine; p-methoxybenzylidene-p′-acetoxyaniline; p,p′-diethoxyazobenzene or p,p′-diethoxyazoxybenzene; p,p′-dinonyloxyazobenzene or p,p′-dinonyloxyazoxybenzene; p,p′-dihexadecyloxyazobenzene or p,p′-dihexadecyloxyazoxybenzene; p,p′-dioctadecyloxyazobenzene or p,p′-dioctadecyloxyazoxybenzene; p,p′-didocosyloxyazobenzene or p,p′-didocosyloxyazoxybenzene; p-ethoxy-p′-acetoxyazobenzene or p-ethoxy-p′-acetoxy-azoxybenzene; p-ethoxy-p′-hexadecanoyloxyazobenzene or p-ethoxy-p′-hexadecyloxyazoxybenzene; p-hexadecyloxy-p′-hexadecyloxyazobenzene or p-hexadecyloxy-p′-hexadecanoyloxyazoxybenzene; p-ethoxybenzyl-1-aminonaphthalene-4-azobenzene; p-hexyloxybenzyl-1-aminonaphthalene-4-azobenzene; p-decyloxybenzyl-1-aminonaphthalene-4-azobenzene; p-isohexyloxybenzyl-1-aminonaphthalene-4-azobenzene; p-amino-p′-azobenzenesulfonic acid; and p-amino-m-sodium sulfonate-p′-sodium azobenzenesulfonate.

According to the present invention, the foamable thermoplastic resin composition should contain at least 0.01 percent by weight, based on said thermoplastic resin, of at least one compound represented by the aforementioned Formula (I) or (II), with the total content of such Formula (I) or (II) compounds falling in the range of 0.01 to 5 percent by weight based upon the thermoplastic resin used. The amount of Formula (I) or (II) compound or compounds may be selected anywhere within this range depending on the types of resin and blowing agent used as well as on the shape, physical and mechanical properties of the intended foam. However, it is operably preferable that the total amount be in the range of 0.02 to 3 percent by weight. If the total content of the Formula (I) or (II) compounds is smaller than 0.01 percent by weight, the resultant foam will have significantly inferior properties, including remarkably reduced dimensional stability at elevated temperatures. On the other hand, using more than 5 percent by weight generally gives no further improvement and may show undesirable plasticizing action.

The compounds represented by the Formula (I) or (II) have unique effects that have been unknown heretofore. That is to say, as is shown by the shrinkage as a function of time at 70° C. curves in FIG. 1, these products are highly effective to improve the stability of foam products at elevated ambient temperatures. Thus, it is apparent from FIG. 1 that the thermoplastic resin compositions of the present invention are very useful for the production of foam products having improved thermal stability for such applications as heat-insulating materials and shock-absorbing materials that involve prolonged exposure to elevated temperatures.

The thermoplastic synthetic resins usable for the foamable thermoplastic resin composition of the present invention include polystyrene, styrenic copolymers composed of styrene and other monomer or monomers copolymerizable therewith, and aliphatic olefin polymer resins. Typical examples of such olefin polymer resins are normally solid polymers predominantly composed of olefins, including low-density polyethylene, medium-density polyethylene, high-density polyethylene, isotactic polypropylene and poly-1-butene, and such copolymers of ethylene or propylene and other monomers copolymerizable therewith as propylene-(1-octene)-ethylene copolymer, ethylene-propylene copolymer, ethylene-vinyl acetate copolymer, ethylene-acrylic acid copolymer, ethylene-ethyl acrylate copolymer and ethylene-vinyl chloride copolymer as well as zinc, sodium, calcium and magnesium salts of ethylene-acrylic acid copolymer. These thermoplastic resins may be used individually or as mixtures of two or more thereof.

For mixing the Formula (I) or (II) compound(s) of the present invention with the thermoplastic resin(s) to be employed, such components may be admixed and kneaded by any suitable means such as single-screw extruder, twin-screw extruder, compounding rolls, and Banbury mixer. In any case, a preliminary blend of the Formula (I) or (II) compound(s) and the thermoplastic resin(s) may be prepared as a dryblend or masterbatch, or the Formula (I) or (II) compound(s) may be mixed with the thermoplastic resin(s) in molten or heat-plastified form just before expansion.

The foamable thermoplastic resin composition of the present invention may be expanded into a foam by any well-known methods. For example, conventional extrusion-foaming techniques can be employed in which an admixture of the thermoplastic resin and the Formula (I) or (II) compound(s) of the present invention is continuously heated and/or worked to be melted or heat-plastified and a volatile organic blowing agent is added thereto at an elevated temperature under high pressure. Then, the resultant molten or heat-plastified mixture is extruded into a lower-pressure zone to be expanded into a foam. Alternatively, a batch method may be used in which the volatile organic blowing agent is added at elevated temperature under high pressure to the molten thermoplastic resin composition and then pressure is removed from the molten mixture system. Also, the thermoplastic resin/Formula (I) or (II) compound composition may be crosslinked with electron beams or a chemical crosslinking agent before expansion, if desired. However, the present invention is particularly effective when applied to extrusion foaming of thermoplastic resin compositions and especially when such compositions are to be expanded to five or more times their original, unexpanded volume.

In the present invention, any well-known chemical blowing agents or volatile organic blowing agents may be used as desired. However, especially preferable for the present invention are volatile organic blowing agents that have boiling points lower than the melting point of the thermoplastic resin employed. Typical examples of such preferable blowing agents include propane, butane, pentane, pentene, hexane, hexene, heptane and octane. Also usable as the blowing agents are such halogenated hydrocarbons meeting the foregoing limitations on the boiling points as methylene chloride, trichlorofluoromethane, dichlorofluoromethane, chlorodifluoromethane, chlorotrifluoromethane, dichlorodifluoromethane, 1,1-dichloroethane, 1-chloro-1,1-difluoroethane, 1,2-dichlorotetrafluoroethane, monochlorotetrafluoroethane, chloropentafluoroethane and the like, including mixtures thereof. In addition to such volatile organic blowing agents, known chemical blowing agents such as azodicarbonamide, azobisisobutyronitrile, dinitrosopentamethylenetetramine, p-toluenesulofonyl hydrazide and the like can be optionally employed. Mixtures of these chemical blowing agents and volatile organic blowing agents may also be used.

The expandable or foamable thermoplastic resin composition according to the present invention may contain minor amounts of lubricating and nucleating agents such as zinc stearate or similar metal soaps and finely-ground calcium silicate or the like inorganic materials. Also, the resin composition of the present invention may contain an ultraviolet light absorber, antistatic agent, stabilizer, colorant and/or lubricating agent other than the foregoing in a total amount not exceeding 5 percent by weight.

The foamable thermoplastic resin composition according to the present invention may be expanded into almost any shapes including sheets, blocks, rods and pipes, or it may be used for electric wire and cable coverings or sheathings or as a variety of other formed articles.

Hereinafter, the present invention is further illustrated by the following examples and accompanying comparative or reference experiments, in which the effects of the present invention were evaluated in terms of the dimensional change of the resultant foams with time at normal room temperature and their dimensional stability at elevated temperatures, which were measured and tested in the following manner:

(a) Dimensional change after expansion

Specimens were prepared by extrusion foaming the respective resin compositions of the preferred examples and reference experiments into round foam bars, which were cut to about 50 cm in length immediately after expansion. Just after preparation (about one minute after expansion), and after N days at normal room temperature, the diameter and length of each specimen were accurately measured with a vernier caliper (JIS grade 1) and steel rule (JIS grade 1) to determine its volume, which was in turn applied to the following formula to work out the shrinkage N days after expansion.

$$\text{Shrinkage } N \text{ days after expansion} = \left(1 - \frac{\text{Volume of foam } N \text{ days after expansion}}{\text{Volume of foam just after expansion}}\right) \times 100 \, (\%)$$

This measurement was made every day for 30 days, and the dimensional change after expansion was evaluated on the basis of the maximum shrinkage in that period.

From an industrial and practical viewpoint, it is required that the maximum shrinkage as measured in the foregoing manner be 15% or less, because if the maximum shrinkage exceeds this level not only is a much longer time (more than one month) required for the foam to stabilize and recover its original dimensions but also the foam can hardly secure an acceptable surface condition.

(b) Elevated temperature dimensional stability

Foams prepared in the same manner as in the preceding paragraph (a) were left to stand in the air until their dimensions and physical properties were stabilized. The thus aged foams were cut to about 20 cm in length to obtain specimens. Two gauge marks were put on the center portion of each specimen 10 cm spaced apart longitudinally from each other. After measuring the distance between these gauge marks and the diameter of the specimens to find their volumes, the specimens were left to stand in a hot-air thermostatic chamber at 70° C. for different predetermined time periods. Then, the specimens were taken out of such hot-air chamber and left to stand in the air at room temperature (about 25° C.) for one hour to be cooled naturally. On the thus treated specimens, the distance between the gauge marks and the diameter were measured again to find their volumes, and the measurements were applied to the following formula to calculate their percent shrinkage after being heated for N hours.

$$\text{Shrinkage after } N \text{ hours of heating} = \left(1 - \frac{\text{Volume of foam heated for } N \text{ hours}}{\text{Volume of foam before heating}}\right) \times 100$$

This measurement operation was repeated on the specimens heated for varied periods up to one week, and the elevated temperature dimensional stability was evaluated in terms of the maximum shrinkage obtained in the series of measurement operation.

For using foamed products as heat-insulating materials or shock-absorbing materials, their percent shrinkage at elevated temperatures being smaller than about 10% is generally acceptable from a practical point of view, although it is often desired that they undergo a possibly smaller shrinkage as a matter of course. Also, it is desired that this shrinking behavior takes place as slowly as possible, because foams showing such a slow shrinking behavior are effectively durable to a longer period of use. While foams that tend to recover their original sizes after showing a large shrinkage are not desirable practically because such foams undergo a remarkable change in their shock-absorbing performance during the course of such shrinkage and recovery therefrom. Especially, such foams are unsuited for a heat-insulating purpose because they undergo formation of crevices.

EXAMPLES AND REFERENCE EXPERIMENTS

To 100 parts by weight of low-density polyethylene (F-1920 ® produced by Asahi-Dow Limited, with density of 0.919 g/cm$^3$ and MI of 2.0 g/10 min.) as the base resin, 0.06 part by weight of calcium stearate and 0.36 part by weight of calcium silicate were added as nucleators. Then, each of the compounds A, B, C, D, E, F, G and H shown in Table 1 was added, in an amount shown in Table 2, to the resultant mixture of the base resin and nucleators. Each of the resultant resin compositions was fed into a single-screw extruder with a barrel diameter of 30 mm and provided with a die having a round aperture of 5 mm in diameter. In the extruder, the resin composition was melted and kneaded with a volatile blowing agent (shown in Table 2) fed separately thereto and, after being cooled through a cooler, the molten mixture was extruded through the die into the atmosphere to be expanded into a foam.

As the blowing agents, 18 parts by weight of dichlorodifluoromethane (F-12) or 18 parts by weight of 1,2-dichlorotetrafluoromethane (F-114) was added as shown in Table 2. Also the temperature of the gel just before extrusion from the die was controlled to 105° C.~108° C.

The resultant foams were subjected to evaluation in terms of the aforementioned items, the results of which are summarized also in Table 2 and shown in FIG. 1.

As is clearly shown in Table 2 and in FIG. 1, the resin compositions prepared according to the present invention are highly effective to produce foams which not only undergo only a relatively small dimensional change after expansion, but also have a significantly improved dimensional stability at elevated temperatures.

TABLE 1

| Additives | Compound Names |
|---|---|
| A | p-amino-p'-sodium azobenzenesulfonate |
| B | p-amino-m-sodium sulfonate-p'-sodium azobenzenesulfonate |
| C | p-hexyloxybenzyl-1-aminonaphthalene-4-azobenzene |
| D | p-methoxybenzylidene-p'acetoxyaniline |
| E | 4-benzylideneamino-4'-methoxydiphenyl |
| F | 4,4'-di(p-methoxybenzylideneamino)-azobenzene |
| G | Octadecylamide |
| H | Glycerol trioctadecanoate |

TABLE 2

| | Additives (% by weight) | Blowing Agents | Density of foam (g/cm$^3$) | Dimensional change after expansion (max. percent shrinkage volume) | Elevated temperature dimensional stability (max. percent shrinkage in volume) | Remarks |
|---|---|---|---|---|---|---|
| Examples | | | | | | |
| 1 | A (0.05) | F-12 | 0.041 | 12 | 5 | Resultant foam was well acceptable. |
| 2 | B (0.05) | F-12 | 0.040 | 12 | 5 | Resultant foam was well acceptable. |
| 3 | C (0.05) | F-12 | 0.040 | 12 | 7 | Resultant foam was well acceptable. |
| 4 | D (0.05) | F-12 | 0.039 | 13 | 7 | Resultant foam was well acceptable. |
| Reference Experiments | | | | | | |
| 1* | — | F-114 | 0.040 | 10 | 14 | Resultant foam was well acceptable. |
| 2* | — | F-12 | 0.048 | 40 | — | Resultant foam had remarkable shrinkage with wrinkled surface. |
| 3* | E (0.05) | F-12 | — | — | — | The resin composition could not be expanded into a foam due to too strong nucleating action. |
| 4* | F (0.05) | F-12 | — | — | — | The resin composition could not be expanded into a foam due to too strong nucleating action. |
| 5* | G (0.07) | F-12 | 0.040 | 8 | 18 | Resultant foam was well acceptable. |
| 6* | H (1.5) | F-12 | 0.039 | 8 | 20 | Resultant foam was well acceptable. |

*Not examples of the present invention.

What is claimed is:

1. A foamable thermoplastic resin composition, comprising a thermoplastic synthetic resin, a blowing agent, and from about 0.01 to about 5 percent by weight, based on said thermoplastic synthetic resin, of at least one compound represented by the following Formula (I) or (II):

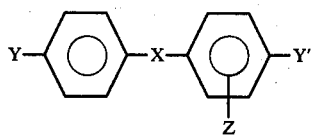

wherein X is a radical to be selected out of a group consisting of —CH=N—, —N=N— and

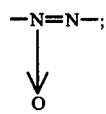

Y and Y' represent, respectively, a radical belonging to a group A consisting of —CN, —COOR, —OCOR, —NO$_2$, —SO$_3$H and —SO$_3$M and a radical belonging to a group B consisting of —OH, —OR, —OR—OCH$_3$, —NH$_2$, —NHR' and R or visa versa, or Y and Y' represent the same radical or different radicals belonging to said group B, with R being an aliphatic hydrocarbon group, R' being an aliphatic hydrocarbon group or a phenyl group, and M being a metal ion belonging to the Group 1a or 2a of the periodic table; and Z represents a hydrogen atom or a radical to be selected out of said group A;

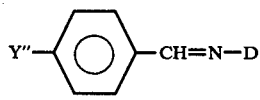

wherein D represents

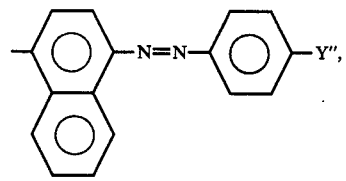

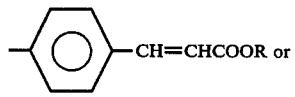

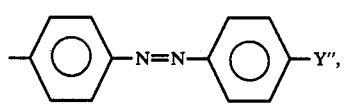

and wherein Y" represents a radical to be selected out of a group consisting of —H, —OH, —OR, —O-R—OCH$_3$, —NH$_2$ and —NHR'; R represents an aliphatic hydrocarbon group; and R' represents an aliphatic hydrocarbon group or a phenyl group.

2. The foamable thermoplastic resin composition of claim 1 wherein said thermoplastic synthetic resin comprises an aliphatic olefin polymer.

3. The foamable thermoplastic resin composition of claim 1 wherein the blowing agent comprises a volatile organic blowing agent.

4. The foamable thermoplastic resin composition of claim 1 wherein the thermoplastic resin is low density polyethylene.

5. The foamable thermoplastic resin composition of claim 1 wherein the blowing agent is dichlorodifluoromethane.

6. A substantially closed-cell foam article of a thermoplastic synthetic resin having incorporated therein from 0.01 to 5 weight percent based upon said resin of a compound of the Formula (I) or (II):

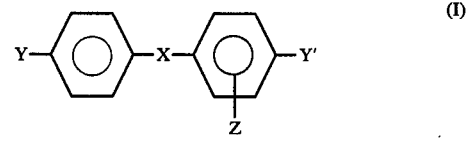

wherein X is a radical to be selected out of a group consisting of —CH=N—, —N=N— and

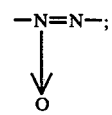

Y and Y' represent, respectively, a radical belonging to a group A consisting of —CN, —COOR, —OCOR, —NO$_2$, —SO$_3$H and —SO$_3$M and a radical belonging to a group B consisting of —OH, —OR, —OR—OCH$_3$, —NH$_2$, —NHR' and R or visa versa, or Y and Y' represent the same radical or different radicals belonging to said group B, with R being an aliphatic hydrocarbon group, R' being an aliphatic hydrocarbon group or a phenyl group, and M being a metal ion belonging to the Group 1a or 2a of the periodic table; and Z represents a hydrogen atom or a radical to be selected out of said group A;

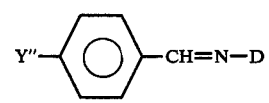

wherein D represents

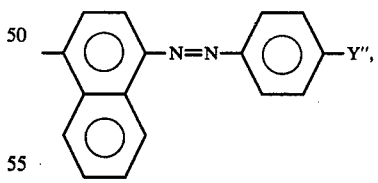

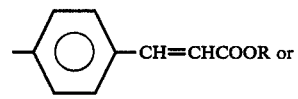

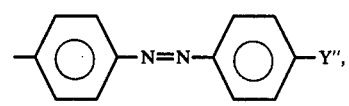

and wherein Y" represents a radical to be selected out of a group consisting of —H, —OH, —OR, —O-

R—OCH$_3$, —NH$_2$ and —NHR'; R represents an aliphatic hydrocarbon group; and R' represents an aliphatic hydrocarbon group or a phenyl group.

7. The foam article of claim 6 wherein the thermoplastic synthetic resin comprises an aliphatic olefin polymer.

8. The foam article of claim 6 wherein the thermoplastic synthetic resin is low density polyethylene.

9. The foam article of claim 6 wherein the Formula (I) or (II) compound is incorporated in an amount corresponding to from 0.02 to 3 percent by weight based upon the weight of said thermoplastic synthetic resin.

* * * * *